No. 753,974. PATENTED MAR. 8, 1904.
J. H. GLAUBER.
BASIN COCK FASTENER.
APPLICATION FILED MAY 1, 1903.
NO MODEL.

ATTEST.
D. Brunert
R. Zbornik

INVENTOR.
Joseph H. Glauber.

By. H. J. Fisher ATTY

No. 753,974.

Patented March 8, 1904.

UNITED STATES PATENT OFFICE.

JOSEPH H. GLAUBER, OF CLEVELAND, OHIO.

BASIN-COCK FASTENER.

SPECIFICATION forming part of Letters Patent No. 753,974, dated March 8, 1904.

Application filed May 1, 1903. Serial No. 155,139. (No model.)

*To all whom it may concern:*

Be it known that I, JOSEPH H. GLAUBER, a citizen of the United States, residing at Cleveland, in the county of Cuyahoga and State of Ohio, have invented certain new and useful Improvements in Basin-Cock Fasteners; and I do declare that the following is a full, clear, and exact description of the invention, which will enable others skilled in the art to which it appertains to make and use the same.

My invention relates to basin-cock fasteners.

Hitherto the nut which secures the cock upon the marble slab and threads on the lower portion thereof beneath the slab has always been run up directly against the under side of the slab, thus bringing it into a position where it was very difficult to apply a wrench both for fastening it and for removing it and working much annoyance to plumbers. Hence I conceived the idea of providing a fastener which intervenes the nut and the slab and which serves as a direct bearing for the nut to apply the pressure for tightening the cock upon the slab as effectively as before and with greatly-increased convenience.

Figure 1:
Figure 2:
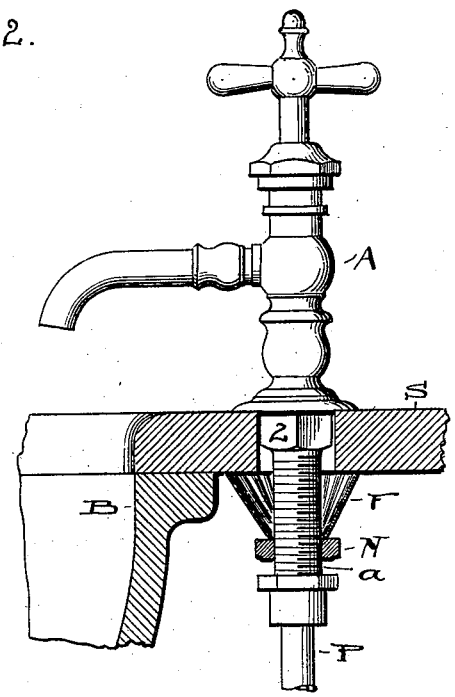
Figure 3:
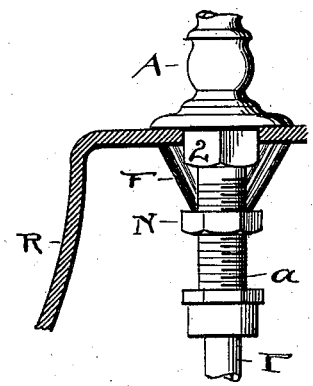

In the accompanying drawings, Figure 1 is a perspective view of the fastener alone, and Fig. 2 is an elevation of a basin-cock to which the fastener is applied and showing the fastener and the basin and marble slab in section. Fig. 3 is a sectional view of a modification of the invention.

A represents a common form of basin-cock, B the basin, and S the marble slab. The cock has a threaded stem $a$, extending down through slab S, with which the water-supply pipe P is coupled, as usual; and on the said stem $a$ is a nut N, also as usual.

F is my new "fastener," so-called, the same being either cast or struck from metal into substantially conoidal shape and preferably fluted lengthwise with the flutes or corrugations preferably deepest at its larger end and practically running out at the smaller end. This fastener is large enough at its smaller end to sleeve or pass freely over stem $a$ and rests with its larger flared edge up against the bottom of slab S, while nut N presses against it below. Thus interposed between slab and nut the nut is kept down away from the slab at such a distance that a wrench can be easily applied thereto for both tightening and loosening purposes, while the fastener serves also to center and brace the stem of the cock and give rigidity to the connection not possible ordinarily when a nut alone is used, especially since the nut is so very difficult to fasten alone and often is left comparatively loose.

By making the fastener with flutes or corrugations, substantially as shown, I can use a lighter metal than would be possible with a plain surface, as the flutes or corrugations greatly increase the sustaining strength or resistance of the fastener and prevent collapsing under pressure. It occurs also as a material advantage in a fastener of this kind that small blocks of wood or other like washers for the purposes of making a seat for the nut N are not required when this fastener is used.

In Fig. 3 I show a modification in which slab S is substituted by a metallic plate or porcelain-covered slab R, having a body of sheet-steel, as is now becoming common in this art and which, owing to the thinness of the metal, requires also a modification of means for securing the basin-cock thereon. To this form of slab my invention is peculiarly adapted, as is plainly seen.

It will be noticed that the hexagon 2, cast upon the cock A and set into slab S to secure it therein against rotation, comes down beneath slab P some distance necessarily. Hence an ordinary tightening-nut cannot be used in this connection and some new means for securing the cock are necessary. It will also be seen that my fastener F is peculiarly adapted to this use, and it not only serves for both places or in connection with both slabs here shown, but is adapted to be used with other makes of cocks than this particular one, in which varying sizes are found and to which this fastener is applicable, because it is made large enough at its smaller end to go with the largest sizes of threaded stems and lengths of hexagons.

What I claim is—

1. As a new article of manufacture, a fastener adapted to be used in fastening water-cocks, said fastener being of conoidal shape and having corrugations between its edges and smooth internally in its smaller portion, substantially as described.

2. A basin-cock and a slab supporting the cock, in combination with a tapered tubular fastener for the cock having its larger end bearing against the bottom of the slab and a nut on the stem of the cock bearing against the smaller end of said fastener, substantially as described.

3. The basin-slab and the basin-cock having a threaded stem projecting beneath said slab, in combination with a fluted fastener of substantially conoidal shape having its larger end bearing against the bottom of the slab and its smaller end about said stem, and a nut on said stem engaged against said fastening device and holding it in place, substantially as described.

Witness my hand to the foregoing specification this 21st day of April, 1903.

JOSEPH H. GLAUBER.

Witnesses:
R. B. MOSER,
R. ZBORNIK.